H. F. STRATTON.
AUTOMATIC ACCELERATING CONTROLLER.
APPLICATION FILED JULY 7, 1908.
915,246.
Patented Mar. 16, 1909.
2 SHEETS—SHEET 1.
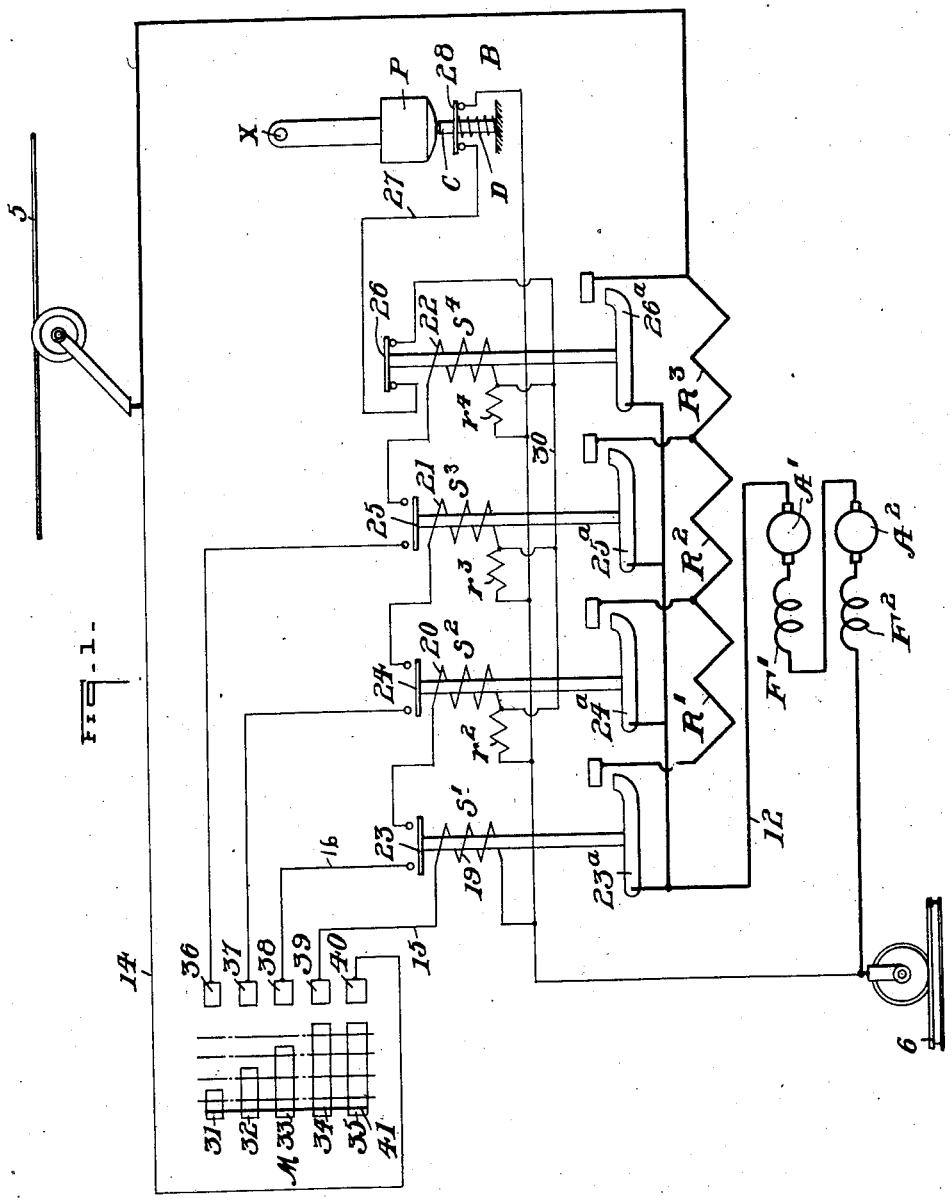
WITNESSES:
INVENTOR
H. F. Stratton
by F. N. Barber
ATTORNEY

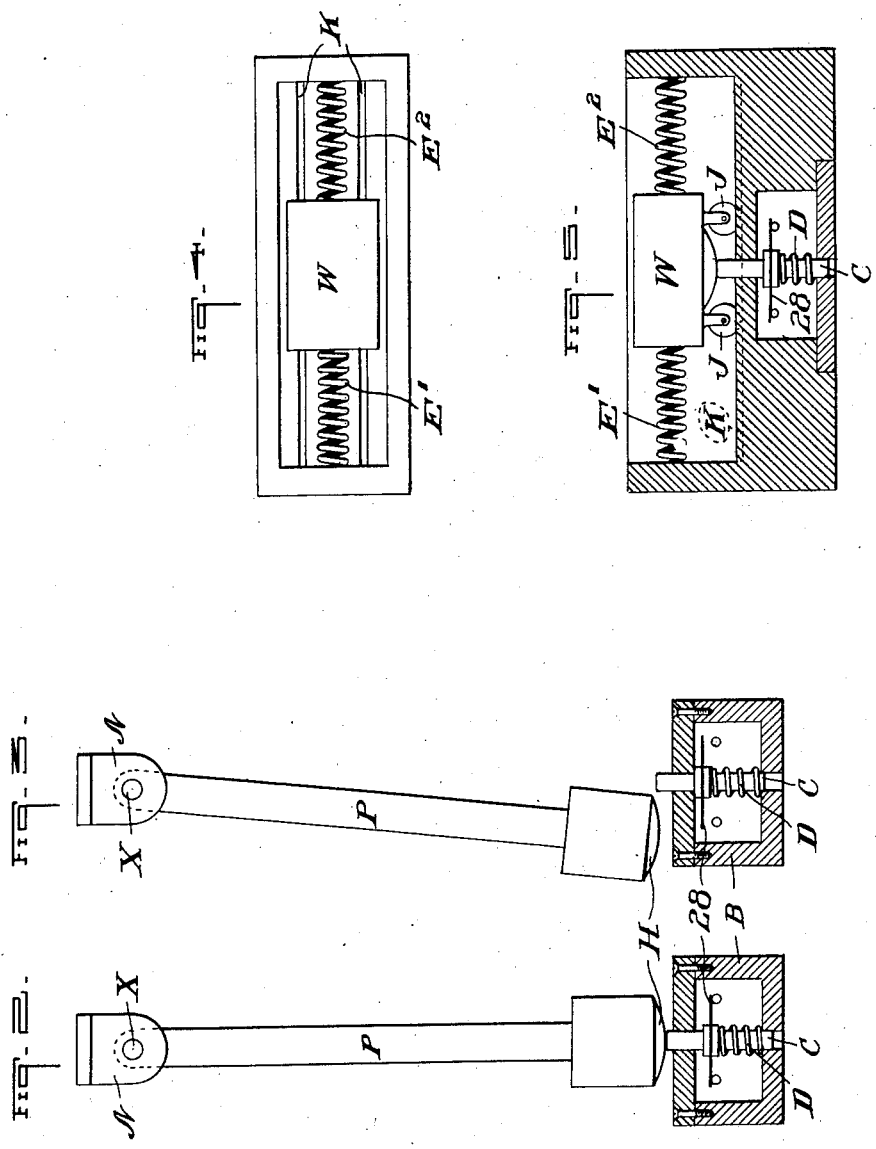

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

AUTOMATIC ACCELERATING-CONTROLLER.

No. 915,246.  Specification of Letters Patent.  Patented March 16, 1909.

Application filed July 7, 1908. Serial No. 442,393.

*To all whom it may concern:*

Be it known that I, HARRY F. STRATTON, a citizen of the United States, residing at Cleveland, in the county of Cuyahoga and State of Ohio, have invented or discovered new and useful Improvements in Automatic Accelerating-Controllers, of which the following is a specification.

My invention relates broadly to controllers of the automatic accelerating type for electric motors.

More definitely my invention relates to controllers of the said type for use on electric cars when the acceleration of the car or train of cars is desired to be made at a predetermined rate, which cannot be exceeded even when the operator throws the master controller to full on-position with great rapidity.

The object of my invention is to produce a controller of such design that a car or train of cars may be accelerated so as not to exceed a predetermined limit and not to fall below a predetermined limit; that a car or train of cars may be accelerated at a rate which will be largely independent of the load on the cars and of voltage fluctuations; that a car or train of cars may be accelerated to full or partially full speed in the least time which is consistent with the strength of the driving and driven members; that the rapidity with which the starting resistance is cut out of the motor circuit is made dependent upon the acceleration only of the car or train of cars; that a change in motor connections, such as changing the motors from the series to the parallel relation, is made dependent upon the acceleration only of the car or train of cars; that the acceleration device may, because of its inertia, be susceptible to the acceleration changes in the car or train of cars; that the inertia-controlled device will not, upon the occurrence of an excess rate of acceleration, open the actuating circuit of the magnetic accelerating switch which is about to close, but merely will act to insert in series with the coil of the switch about to close a resistance, which will deenergize the coil no further than is necessary to prevent the closing of the said switch; that the resistance which prevents the closure of an accelerating switch upon occurrence of an excess rate of acceleration acts subsequently to the closure of the switch to reduce the flow of current through the actuating coil of the said switch; that the inertia-controlled relay may be automatically short circuited when the last resistance switch closes; that a car or train of cars may be automatically accelerated at less than normal acceleration when ascending grades, and at more than normal acceleration when descending grades; and that one size of inertia-controlled relay may be suitable for different sizes of motors.

Referring to the accompanying drawings; Figure 1 is a diagram of connections of one form of controller constructed in accordance with my invention; Fig. 2, one type of an inertia-controlled relay showing the parts as they are when the vehicle to which it is attached is running at constant speed, the switch box being in section; Fig. 3, a view similar to Fig. 2 with the inertia device showing an acceleration toward the right; Fig. 4, a plan of a second form of my inertia-controlled device; and Fig. 5, a longitudinal section of the frame for the same, the movable parts being in elevation.

In Fig. 1, $S'$, $S^2$, and $S^3$ are magnetically operated switches carrying respectively auxiliary switch contacts 23, 24 and 25, which are closed when the corresponding switch arms $23^a$, $24^a$, and $25^a$ are closed. $S^4$ is also a magnetically operated switch carrying an auxiliary switch contact 26 which is closed when the switch arm $26^a$ is open and which is open when the said switch arm is closed. M is a master controller which is moved by the operator to stop or start the motor or motors, having the armatures $A'$ and $A^2$ and the series field windings $F'$ and $F^2$. P is the inertia-controlled device for closing the accelerating relay B, which device in Figs. 1, 2, and 3 is shown as a pendulum, hung upon the pivot X and free to swing in either direction in which the car or train of cars may move. When the car or train of cars is accelerating, a horizontal force will act on the pendulum P, tending to cause said pendulum to swing in a direction opposite to the direction of motion of the car. This horizontal force will be directly proportional to the rate of acceleration and when the acceleration has become zero, or in other words, when the velocity of the car has become constant, the pendulum will hang in a vertical position. $R'$, $R^2$ and $R^3$ are sections of a starting resistance controlled by switches $S^2$, $S^3$, and $S^4$, respectively. The switches $S^2$, $S^3$, and $S^4$ each have an auxiliary section of resistance designated, respectively, $r^2$, $r^3$, and $r^4$, and so connected that when switch 28, controlled by the inertia-controlled relay P is closed, these sections of resistance are short-circuited, and when the switch 28 is opened by an excess rate of acceleration, these sections of resistance are placed in circuit. The resistances $r^2$, $r^3$, and $r^4$ are so proportioned that when they are included in the circuits of their respective actuating coils 20, 21 and 22, sufficient current will not flow to cause the switch to close, but will permit sufficient current to flow to keep the switches $S^2$, $S^3$, and $S^4$ closed after they have been closed. 5 represents the trolley wire or third rail, and 6 the traction rail or other ground or return connection.

The operation of my controller as represented in Figs. 1, 2, and 3 is as follows: Assuming that the master controller M is moved to position 1, so that the contact 39 and 40 touch segments 34 and 35, respectively, current will flow from the trolley wire 5 through the wire 14, the contact 40, the segment 35, the segment-connection 41, the segment 34, the contact 39, the wire 15, and the coil 19, to the rail 6. This current causes the coil 19 to close the switch S which establishes a circuit through the motors as follows: from the trolley wire 5 through the wire 7, the resistances $R^3$, $R^2$, and $R'$, the main contacts of the switch $S'$, the wire 12, the armature $A'$, the field $F'$, the armature $A^2$, the field $F^2$, and the wire 13 to the rail 6. This circuit will cause the motors to start the car, and the pendulum P will at once swing back. When the said pendulum swings back, it allows the compression spring D to force up the rod C, which carries the movable relay contact or switch 28, thus opening the relay B. As the acceleration decreases, the pendulum P will swing toward a vertical position and when it has reached a predetermined position, it will force down the rod C, closing the switch 28 of the relay B. Since, however, the master controller has been moved to position 1 only, the actuating coils 20, 21, and 22 of the switches $S^2$, $S^3$, and $S^4$, respectively, has not received current through their respective contacts 38, 37, and 36, and the switches $S^2$, $S^3$, and $S^4$ cannot therefore close. If the operator at once throws the master controller from the off-position to position 4, the switch $S'$ closes as previously described, starting the motors and the car or train, which causes the pendulum P to swing back. As soon as the switch $S'$ closes, a circuit through the actuating coil 20 of the switch $S^2$ is established as follows: from the trolley wire 5 through the wire 14, the contact 40, the segment 35, the connection 41, the segment 33, the contact 38, the wire 16, the switch 23, the actuating coil 20, and the resistance $r^2$, to the rail 6. The switch $S^2$ will not, however, close because the resistance $r^2$ limits the current to a value low enough to prevent its closure. When the acceleration falls to such a value that the pendulum P closes the switch 28, the resistance $r^2$ is short circuited as follows: through the wire 30, the switch 26, the wire 27, and the switch 28 to the rail 6. The removal of the resistance $r^2$ from the circuit of the coil 20 will permit the latter to cause the switch $S^2$ to close and will cut the resistance $R'$ out of the motor circuit. The car will thus be given a fresh acceleration, causing the pendulum P to swing back again and the switch 28 to open. The switches $S^3$ and $S^4$ will close as the switch $S^2$ closes, and in the proper sequence, and will cut out of the motor circuit the sections $R^2$ and $R^3$ of the resistance. When, however, the switch $S^4$ has closed, the auxiliary switch 26 is opened, thereby cutting out the switch 28. The switches $S^2$, $S^3$, and $S^4$ will, however, remain closed by virtue of the current flowing through the resistances $r^2$, $r^3$, and $r^4$.

Referring now to Figs. 2 and 3, they show the pendulum type of inertia-controlled device for operating the accelerating relay B. This pendulum P is supported by the bracket N, and is free to swing in either direction on the pivot X. On the bottom of the pendulum is a curved track H, which forces down the rod C when the pendulum is in a vertical or nearly vertical position, as shown in Fig. 2. It is evident that by varying the contour of the track H, the rod C may be pushed down at different deflections of the pendulum P from the vertical. When the rod C is pushed down the switch 28 of the relay B is closed. The spring D forces up the rod C, and opens the switch 28 when the position of the pendulum permits such movement, as shown in Fig. 3.

In Figs. 4 and 5, W is a block or car of, preferably, iron or lead carried by four wheels J which run in the tracks K. $E'$ and $E^2$ are springs designed to hold the block W in its normal central position. When the car accelerates, say, to the right, the block or car W will be forced back against the action of the spring $E'$. The bottom of the car W has the track $H'$ which acts in an obvious manner similarly to that in which the track H of the pendulum P acts. It is evident that the inertia devices P and W have the following valuable characteristics: First, when the car or train of cars is being accelerated on an up-grade, the pendulum P or the weight W will, in addition to the accelerating force, be acted upon by a force which is a component of gravity, and that both of these forces will tend to move the inertia controlled device P or W in a direction opposite to the direction of the motion of the car. In this case, therefore, the acceleration must fall to a lower value than it would have fallen on a level track, before switch 28 closes, and consequently a fresh acceleration is applied to the car or cars; and second, when the car or train of cars is being accelerated on a downgrade, the pendulum P or the weight W will, in addition to the accelerating force, be acted upon by a force which is a component of gravity, but the component of gravity will, however, tend to move the inertia controlled device P or W in a direction the same as the direction of the motion of the car, whereas the accelerating force of the car or cars will tend to move the said inertia-controlled device in the opposite direction. In this latter case, therefore, the acceleration does not fall to as low a value as it does on a level track, before switch 28 is closed and a fresh acceleration is applied to a car or train of cars. It follows therefore, that on up-grades, a car or train of cars equipped with my controllers will be accelerated more slowly than on a level track; and that on down-grades a car or train of cars equipped with my controller, will be accelerated more rapidly than on a level track. Both of these results help to secure the fastest acceleration consistent with the strength of the driving and driven members.

I claim—

1. In a control system, a load to be accelerated, means for automatically accelerating the load, and reciprocating means directly responsive to the acceleration of the load for governing the accelerating means.

2. In a control system, a load to be accelerated, means for accelerating the load, and an acceleration-relay directly responsive to the acceleration of the load for governing the accelerating means, the acceleration-relay being adapted to give slower than normal acceleration on up-grades and faster than normal acceleration on down-grades.

3. In a control system, a load to be accelerated, means for automatically accelerating the load, and a pivoted reciprocating weight to govern the accelerating means, the relative movement of the weight and the load being directly responsive to the acceleration of the load.

4. In a control system, a load to be accelerated, means for automatically accelerating the load, a reciprocating weight to govern the accelerating means, the relative movement of the weight and the load being directly responsive to the acceleration of the load, and the extent of the said movement being proportional to the acceleration of the load.

5. In a control system, a load to be accelerated, means for automatically accelerating the load, a weight to govern the accelerating means, the relative movement of the weight and the load being directly responsive to the acceleration of the load, and the extent of said movement being proportional to the acceleration of the load, the weight returning to a definite position when the acceleration of the load becomes zero.

6. In a control system, a load to be accelerated, means for accelerating the load, an acceleration-controlled device directly responsive to the acceleration of the load and having movement proportional to the acceleration of the load, and means whereby said acceleration-controlled device may increase the velocity of the load when the acceleration of the load has decreased to a certain predetermined limit.

7. In a control system, a load to be accelerated, an electric motor for accelerating the load, a plurality of automatic step by step means for increasing the speed of the motor, and means directly responsive to the acceleration of the load for governing the action of the step by step speed increasing means.

8. In a control system, a load to be accelerated, an electric motor for accelerating the load, sections of resistance for regulating the speed of the motor, magnetic switches for controlling the resistance sections, and means for controlling the switches, said means being directly responsive to the acceleration of said load.

9. In a control system, a load to be accelerated, an electric motor for accelerating the load, and means for increasing the speed of the motor, a relay for governing said speed increasing means, and a device responsive to the acceleration for governing the relay.

10. In a control system, a load to be accelerated, an electric motor for accelerating the load, a series of switches, the successive closure of which is adapted to increase the speed of the motor, a relay for controlling the successive closure of the switches, and means responsive to the acceleration of the load for governing the relay.

11. In a control system, a load to be accelerated, an electric motor for accelerating the load, a series of magnetic switches, the successive closure of which is adapted to increase the speed of the motor, an automatic throttle having contacts in the circuit of the windings of said switches, and means responsive to the acceleration of the load for opening the throttle when the acceleration of the load is above a predetermined maximum.

Signed at Cleveland, Ohio, this 29th day of June, 1908.

HARRY F. STRATTON.

Witnesses:
A. C. EASTWOOD,
H. S. RICHARDSON.